United States Patent Office 2,921,085
Patented Jan. 12, 1960

2,921,085

PREPARATION OF β-AMINOPROPIONAMIDES

Charles H. Schramm, Hillsdale, N.J., assignor to Lever Brothers Company, New York, N.Y., a corporation of Maine No Drawing. Application November 1, 1952
Serial No. 318,317

1 Claim. (Cl. 260—458)

This invention relates to novel β-alkylaminopropionamides having the following general formula:

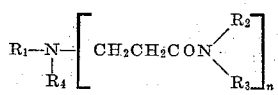

in which $R_1$ is selected from the group consisting of saturated and unsaturated acyclic hydrocarbon radicals having 8 to 18 carbon atoms; $R_2$ and $R_3$ are selected from the group consisting of hydrogen, alkyl having 1 to 12 carbon atoms, alkylol having 1 to 5 carbon atoms, alkylol linked to nitrogen through 1 to 5 alkylene oxide groups, the alkylene group having 1 to 5 carbon atoms, alkyl sulfate of 1 to 5 carbon atoms, and alkyl sulfonate of 1 to 5 carbon atoms; n is an integer from 1 to 2; and $R_4$ is hydrogen when $n$ is 1.

Generally speaking, the novel compounds of this invention may be prepared by reacting a saturated or an unsaturated acyclic amine with an acrylate to form an aminopropionate and reacting the propionate with an amine to form an aminopropionamide. For example, an alkylamine may be reacted with an acrylate to form an alkylamino propionate and the latter compound is reacted with an amine to form an alkylaminopropionamide as shown by the following sequence of reactions:

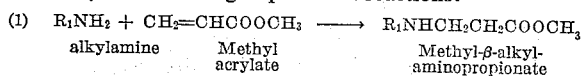

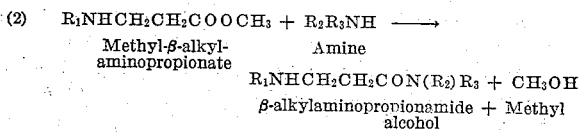

in which $R_1$ is selected from the group consisting of saturated and unsaturated acyclic hydrocarbon radicals having 8 to 18 carbon atoms; $R_2$ and $R_3$ are selected from the group consisting of hydrogen, alkyl having 1 to 12 carbon atoms, alkylol having 1 to 5 carbon atoms, alkylol linked to nitrogen through 1 to 5 alkylene oxide groups, the alkylene group having 1 to 5 carbon atoms, alkyl sulfate of 1 to 5 carbon atoms, and alkyl sulfonate of 1 to 5 carbon atoms.

The above sequence of reactions shows the preparation of β-alkylaminopropionamides. To prepare the β-alkylaminodipropionamides, the same sequence is employed except that two mols of methyl acrylate are used to each mol of alkylamine, on a theoretical basis.

Reaction (1) above is essentially the addition of an active hydrogen component to an α,β-unsaturated carbonyl system—a reaction which is similar to a Michael condensation. The reaction is performed by merely mixing the necessary amounts of the component starting materials. Some alkylamino diester is also formed in this reaction. However, the reaction of equimolar quantities of alkylamine and methyl acrylate results in the formation of a product which, without further purification, may be used directly in the ammonolysis reaction (2).

The ammonolysis reaction (2) involves the treatment of the alkyl ester with an amine. Ammonia and ethanolamine are efficacious reagents for use in this reaction but any compound containing the NH grouping may be used also, such as alkylolamines, aminecarboxylic acids, aminesulfonic acids, and the like. The ammonolysis reaction is carried out by mixing the ammonia or amine component with the ester product. The reaction when carried out with aqueous solutions of the amine component is a heterogeneous one and is complete in five to seven days at room temperature for the $C_8$ to $C_{14}$ esters with longer time being required for the $C_{16}$, $C_{18}$ and tallow amine products. The reaction of the ester condensate with the amine under anhydrous conditions may be greatly accelerated by heating on a steam bath, or in other well-known manner, thus decreasing the time of reaction to about twenty-four hours.

The reaction of decylamine with ethyl acrylate in a mole ratio of 1:1 has been investigated to determine the nature of the products produced by the reaction. High vacuum distillation has revealed that the monocondensate, ethyl-β-decylaminopropionate accounts for at least 82% of the yield. Another 10% of the product was obtained as a forerun which was composed of decylamine, water and ester. The remaining 8% was residue which contained dicondensate. It is known that the aminoesters prepared, according to reaction (1) above, revert to their compartment starting materials under the influence of heat. Hence, it is not surprising that decylamine was obtained in the distillation. A corresponding amount of ethyl acrylate was recovered from the vacuum trap. It is therefore apparent that the 1:1 condensation product is almost entirely monoester along with some diester. This conclusion is further substantiated by the fact that in order to obtain a good yield of the diester, it is necessary to reflux four moles of acrylate to one of amine for 20 hours.

Among the saturated and unsaturated acyclic hydrocarbon amines which may be reacted with methyl acrylate according to the method of the invention are dodecylamine, octylamine, decylamine, tetradecylamine, hexadecylamine, octadecylamine, the amines derived from the fatty acids of coconut oil (a mixture of caproic, caprylic, capric, lauric, myristic, palmitic, stearic, oleic and linoleic acids), referred to as coconut amine, and the amines derived from erucic and linolenic acids.

Sulfated derivatives may be prepared from those compounds in which $R_2$ and $R_3$ contain an alkylol group by reacting the propionamide with any of the well known sulfating agents such as chlorsulfonic acid, sulfuric acid, oleum, $SO_3$-dioxane complex, and $SO_3$-pyridine complex.

Sulfonated derivatives may be prepared from the alkyl- or alkyleneaminopropionates by reaction with taurine or N-methyl taurine.

The invention will be further illustrated by reference to the following examples:

EXAMPLE 1

*Methyl β-dodecylaminopropionate*

One hundred eighty-five grams of dodecylamine was cooled in an ice bath. To this there was added 86 grams of methyl acrylate at a rate sufficiently slow to keep the temperature below 20° C. When all of the acrylate had been added, the reaction mixture was removed from the ice bath and allowed to stand at room temperature for several hours. Although it is possible to distill the ester, it was found that the reaction product is of sufficient purity for use in the subsequent step.

EXAMPLE 2

*β-Dodecylaminopropionamide*

Five hundred cubic centimeters of concentrated aqueous ammonia was added to 240 grams of ethyl β-dodecylaminopropionate. The reaction mixture, which was composed of two liquid layers, was shaken continuously for 16 hours. It was then allowed to stand for an additional two days. At the end of this time the amide had crystallized in the form of shiny white plates, M.P. 75.4–76.2° C. after recrystallization.

EXAMPLE 3

β-Dodecylamino-N-(2-ethylol)-propionamide

Sixty-one grams of ethanolamine was added to 271 grams of methyl β-dodecylaminopropionate. The reaction mixture was shaken occasionally while it was kept at room temperature for six days. At the end of this time, the reaction mixture had turned into a solid cake. A sample of the dodecyl ethanolamide was recrystallized from carbon tetrachloride, M.P. 104.2–104.8° C.

EXAMPLE 4

Methyl β-dodecylaminodipropionate

To 93 grams of dodecylamine there was added 172 grams of methyl acrylate. This mixture was refluxed for 20 hours after which time the excess acrylate was removed. The yield of crude product was quantitative and the material could be used directly in preparing the diamide. For purposes of identification, a portion of the diester was distilled, B.P. 184–187° C. (0.03 mm.).

EXAMPLE 5

β-Dodecylaminodipropionamide

Fifty-one grams of the pure distilled diester were reacted with 200 cc. of ammonium hydroxide as in the monoamide preparation of Example 2. The diamide was obtained in 31 gram yield. No attempt was made to isolate additional quantities of the product from the filtrate. The crude diamide was recrystallized, M.P. 109.4–110.4° C.

EXAMPLE 6

β-Octylaminopropionamide

Methyl β-octylaminopropionate was synthesized from 129 grams of octylamine and 86 grams of methyl acrylate, using the same procedure as was used in Example 1. The resulting ester was then reacted with 600 cc. of concentrated aqueous ammonia. The amide crystallized from the reaction mixture in several days and the melting point of the material after recrystallization from ethyl ether was 58.0–59.0° C.

EXAMPLE 7

β-Decylaminopropionamide

This compound was prepared according to the procedure of Example 1 from 157 grams of decylamine, 86 grams of methyl acrylate and 550 cc. of concentrated aqueous ammonia. The amide after recrystallization from petroleum ether melted at 66.5–67.5° C.

EXAMPLE 8

β-Tetradecylaminopropionamide

Two hundred thirteen grams of tetradecylamine, 86 grams of methyl acrylate and 500 cc. of ammonia were used in this synthesis following the procedure of Example 1. The amide was recrystallized from ethyl ether and melted at 76–77° C.

EXAMPLE 9

β-Hexadecylaminopropionamide

Two hundred and forty-one grams of hexadecylamine, 86 grams of methyl acrylate and 500 cc. of ammonia were used in this synthesis following the procedure of Example 1. The hexadecylamide was obtained. The product, after recrystallization from ethyl ether, melted at 80–81° C.

EXAMPLE 10

β-Octadecylaminopropionamide

The octadecylamide was synthesized from 269 grams of octadecylamine, 86 grams of methyl acrylate and 500 cc. of ammonia following the procedure of Example 1. After recrystallizing from ether, the amide melted at 85–87° C.

EXAMPLE 11

β-Octylamino-N-(2-ethylol)-propionamide

Two hundred fifteen grams of methyl β-octylaminopropionate was synthesized in the same manner as in Example 1. This ester was reacted with 61 grams of ethanolamine at 85–90° C. for twelve hours. A quantitative yield of the ethanolamide was thus obtained, and the melting point of this compound, after recrystallization from carbon tetrachloride, was 98.0–98.6° C.

EXAMPLE 12

β-Decylamino-N-(2-ethylol)-propionamide

Two hundred and forty-three grams of methyl β-decylaminopropionate made in accordance with Example 1 were reacted with 61 grams of ethanolamine, following the procedure of Example 11, and decyl ethanolamide was obtained. Recrystallization from carbon tetrachloride yielded the pure product melting at 101.8–102.6° C.

EXAMPLE 13

β-Tetradecylamino-N-(2-ethylol)-propionamide

This amide was prepared by reacting 299 grams of methyl β-tetradecylaminopropionate with 61 grams of ethanolamine. After recrystallization from carbon tetrachloride, the ethanolamide melted at 102.4–103.4° C.

EXAMPLE 14

β-Hexadecylamino-N-(2-ethylol)-propionamide

The reaction of 327 grams of methyl β-hexadecylaminopropionate with 61 grams of ethanolamine produced the corresponding ethanolamide which, after recrystallization from carbon tetrachloride melted at 104–105° C.

EXAMPLE 15

β-Cocoamino-di-(N-2(ethylol)-propionamide)

Two hundred grams of coconut amine and 344 grams of methyl acrylate were refluxed for 20 hours. The excess acrylate was removed by distillation. A quantitative yield of the dipropionate ester was obtained, which material was subsequently reacted with 122 grams of ethanolamine at room temperature for 21 days. The reaction mixture was completely homogeneous after 3 days. The ethanolamide was obtained as a crystalline waxy solid.

EXAMPLE 16

β-Dodecylamino-di-(N-2(ethylol)-propionamide)

One hundred eighty-five grams of dodecylamine and 344 grams of methyl acrylate were refluxed for 20 hours. After removing the excess acrylate from the dipropionate ester, 112 grams of ethanolamine were added and the mixture was reacted at room temperature for 21 days. A homogeneous reaction system resulted when the temperature approached 85° C. The ethanolamide, when recrystallized from acetone, melted at 77.4–79.4° C.

EXAMPLE 17

β-Cocoamino-N-(2-ethylol)-propionamide

Two hundred six grams of coconut amine and 86 grams of methyl acrylate were reacted at a temperature kept below 20° C. by means of an ice bath. When all the acrylate had been added to the amine, the reaction mixture was removed from the ice bath and allowed to stand at room temperature for several hours. This ester was reacted with 61 grams of ethanolamine for 7 days at room temperature. The ethanolamide was obtained as a crystalline waxy solid.

EXAMPLE 18

*β-Cocoamino-N-(polyethyleneoxy)-propionamide*

Two hundred and ninety-two grams of methyl β-cocoaminopropionate were reacted with 193 grams of a polyethyleneoxide amine of the formula $$NH_2(CH_2CH_2O)_3CH_2CH_2OH$$

by heating at 30–35° C. for 48 hours. The product was obtained as a waxy solid.

EXAMPLE 19

*Methyl β-cocoaminopropionate*

Two hundred six grams of coconut amine were cooled in an ice bath. To this there were added 86 grams of methyl acrylate at a rate sufficiently slow to keep the temperature below 20° C. When all of the acrylate had been added, the reaction mixture was removed from the ice bath and allowed to stand at room temperature for several hours. The product was obtained as a yellow liquid.

EXAMPLE 20

*β-Cocoaminopropionic methyltauride*

Two hundred and ninety-two grams of methyl β-cocoaminopropionate were reacted with 161 grams of sodium N-methyltauride by heating at 350° C. for 48 hours. The tauride was obtained as a white crystalline solid.

EXAMPLE 21

*β-Cocoamino-N-(2-ethylol)-propionamide sulfate*

Sixty-five grams of chlorsulfonic acid was added to 160 grams of β-cocoamino-N-(2-ethylol)-propionamide dissolved in 300 cc. of carbon tetrachloride. The mixture was kept at 20° C. or below during this addition. The carbon tetrachloride was removed by distillation in vacuo and the residue was neutralized with aqueous sodium hydroxide. The sulfate product after removal of the water was obtained as a yellow semicrystalline solid.

EXAMPLE 22

*β-Cocoamino-N-butylpropionamide*

Seventy-three grams of n-butylamine were reacted with 292 grams of methyl β-cocoaminopropionate for 6 days at a temperature of 25° C. The product was obtained as a cream colored crystalline solid.

EXAMPLE 23

*Ethylene oxide condensate of β-cocoamino-di-(N-2-ethylol)-propionamide*

Two hundred and eighteen grams of β-cocoamino-di-N-(2-ethylol)-propionamide were reacted with ethylene oxide at a temperature of 50° C. until 132 grams were absorbed. The reaction product after cooling was obtained as a waxy crystalline solid.

EXAMPLE 24

*β-Dodecylamino-N-dodecylpropionamide*

One hundred and eighty-five grams of dodecylamine was added to 292 grams of methyl-β-cocoaminopropionate and the reaction mixture was allowed to stand for one week at room temperature after which the dodecylamide was removed by filtration. The amide was obtained as a waxy solid.

EXAMPLE 25

*β-Oleylamino-N-(2-ethylol)-propionamide*

The reaction of 267 grams of oleylamine with 86 grams of methylacrylate according to the procedure of Example 1 yielded methyl β-oleylaminopropionate. This ester was reacted with 61 grams of ethanolamine for 7 days to produce the corresponding ethanolamide in the form of a waxy solid.

The compounds of this invention have utility as surface active agents. For example, the compounds are efficatious as emulsifying, wetting, foaming and detergent agents. The utility of the compounds of the present invention is further illustrated by the following table showing the values of the surface tension and suds volume measurements of 0.15% solutions of certain of the amides of this invention:

| Compound | Surface Tension (dynes/cm.) | Suds Volume (cc.) | |
|---|---|---|---|
| | | Immediate | After 1 Hr. |
| Example 15 | 29.3 | 60 | 20 |
| Example 17 | 27.3 | 60 | 30 |
| Example 18 | 28.5 | 110 | 60 |
| Water | 72 | 0 | 0 |

It will be obvious to those skilled in the art that many modifications may be made within the scope of the present invention without departing from the spirit thereof, and the invention is to be restricted only in accordance with the appended claim.

I claim:

A method for preparing an amide having the structure:

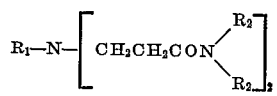

in which $R_1$ is selected by from the group consisting of saturated and unsaturated acyclic hydrocarbon radicals having from 8 to 18 carbon atoms; and $R_2$ and $R_3$ are selected from the group consisting of hydrogen, alkyl having from 1 to 12 carbon atoms, alkylol having from 1 to 5 carbon atoms, alkylol linked to the nitrogen atom through 1 to 5 alkylene oxide groups in which the alkylene group has from 1 to 5 carbon atoms, sulfated alkyl of from 1 to 5 carbon atoms, and sulfonated alkyl of from 1 to 5 carbon atoms, which comprises the steps of reacting an alkylamine having the formula $$R_1-NH_2$$

in which $R_1$ is as defined above, with methylacrylate in the proportion of approximately 1 mol of alkylamine for each 2 mols of methylacrylate and in the presence of a two molar excess of methylacrylate under reflux at a temperature not exceeding the boiling point of methylacrylate for at least 20 hours to form a methyl-β-alkylaminodipropionate; and reacting said methyl-β-alkylaminodipropionate with an amine having the formula,

in which $R_2$ and $R_3$ are selected from the group consisting of hydrogen, alkyl having from 1 to 12 carbon atoms, alkylol having from 1 to 5 carbon atoms, alkylol linked to the nitrogen atom through 1 to 5 alkylene oxide groups in which the alkylene portion has from 1 to 5 carbon atoms, sulfated alkyl radicals of from 1 to 5 carbon atoms, and sulfonated alkyl radicals of from 1 to 5 carbon atoms, to form said amide.

References Cited in the file of this patent

UNITED STATES PATENTS

| | | |
|---|---|---|
| 2,139,190 | Iselin et al. | Dec. 6, 1938 |
| 2,328,021 | Katzman et al. | Aug. 31, 1943 |
| 2,426,891 | Lynch | Sept. 2, 1947 |
| 2,443,062 | Abranovitch | June 8, 1948 |
| 2,451,436 | Erickson | Oct. 12, 1948 |
| 2,479,525 | Thurston | Aug. 16, 1949 |
| 2,480,439 | Bersworth | Aug. 30, 1949 |
| 2,523,275 | Bruce et al. | Sept. 26, 1950 |

OTHER REFERENCES

Braun et al.: Ber. Deut. Chem., vol. 60, p. 351 (1927).

UNITED STATES PATENT OFFICE
CERTIFICATE OF CORRECTION

Patent No. 2,921,085            January 12, 1960

Charles H. Schramm

It is hereby certified that error appears in the printed specification of the above numbered patent requiring correction and that the said Letters Patent should read as corrected below.

Column 2, line 25, for "compartment" read -- component --; column 5, line 75, for "efficatious" read -- efficacious --; column 6, lines 23 to 27, the formula should appear as shown below instead of as in the patent:

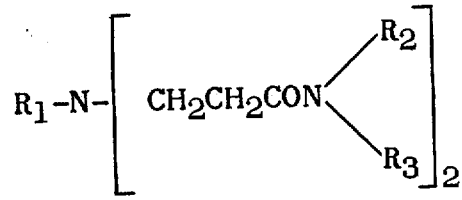

same column 6, line 28, after "selected" strike out "by".

Signed and sealed this 16th day of August 1960.

(SEAL)
Attest:

KARL H. AXLINE
Attesting Officer

ROBERT C. WATSON
Commissioner of Patents